US012646669B2

(12) United States Patent
Oberst et al.

(10) Patent No.: US 12,646,669 B2
(45) Date of Patent: Jun. 2, 2026

(54) MODULE FOR GENERATING OPENING SIGNALS

(71) Applicant: Illinois Tool Works Inc., Glenview, IL (US)

(72) Inventors: Joachim Oberst, Großrinderfeld (DE); Zsolt Wilke, Bad Mergentheim (DE); Erik Dilje, Würzburg (DE); Andreas Rudolf, Eibelstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 182 days.

(21) Appl. No.: 18/213,410

(22) Filed: Jun. 23, 2023

(65) Prior Publication Data

US 2023/0420200 A1 Dec. 28, 2023

(30) Foreign Application Priority Data

Jun. 24, 2022 (DE) ..................... 10 2022 115 844.6

(51) Int. Cl.
*H01H 21/22* (2006.01)
*H01H 9/02* (2006.01)

(52) U.S. Cl.
CPC .............. *H01H 21/22* (2013.01); *H01H 9/02* (2013.01)

(58) Field of Classification Search
CPC .......... H01H 21/22; H01H 9/02; H01H 9/285; H01H 1/26; E05B 81/64; E05B 81/76; E05B 81/90; E05B 77/02; E05B 79/20; E05Y 2900/531
See application file for complete search history.

(56) References Cited

U.S. PATENT DOCUMENTS

| | | | |
|---|---|---|---|
| 1,079,409 | A | 11/1913 | Hendricks |
| 5,632,516 | A | 5/1997 | Schwab |
| 7,244,897 | B2 | 7/2007 | Villagrasa |
| 8,443,553 | B1 | 5/2013 | Polewarczyk |
| 8,629,361 | B2 | 1/2014 | Koyama |
| 8,701,353 | B2 | 4/2014 | Patel |

(Continued)

FOREIGN PATENT DOCUMENTS

| | | | |
|---|---|---|---|
| DE | 102005034763 | B3 | 9/2006 |
| DE | 202006011116 | U1 | 9/2006 |

(Continued)

OTHER PUBLICATIONS

Examination Report dated Jan. 3, 2023 in German application No. 10 2022 115 841.1, filed on Jun. 24, 2022 (8 pages).

(Continued)

*Primary Examiner* — Lheiren Mae A Caroc
(74) *Attorney, Agent, or Firm* — McAndrews, Held & Malloy, Ltd.

(57) ABSTRACT

A module includes a housing having a plug-in region and a switch region; at least one switch, which is connected releasably to the switch region of the housing; and electrical contacts, which are releasably connectable to the at least one switch and extend from the switch region at least partially into the plug-in region. The electrical contacts are configured so as to make electrical contact with an on-board plug for transmitting an electrical signal, wherein the electrical contacts each comprise a first end which, in the installed state, is biased against one of the contacts of the at least one switch.

10 Claims, 10 Drawing Sheets

100

(56) References Cited

U.S. PATENT DOCUMENTS

| | | | | |
|---|---|---|---|---|
| 8,733,022 | B2 | 5/2014 | Sonnek | |
| 8,809,710 | B2 | 8/2014 | Ulomek | |
| 9,316,020 | B2 | 4/2016 | Lee | |
| 10,550,610 | B2 | 2/2020 | Linden | |
| 10,550,611 | B2 | 2/2020 | Och | |
| 11,578,513 | B2 | 2/2023 | Heyduck | |
| 11,679,651 | B2 | 6/2023 | Couto Maquieira | |
| 12,368,011 | B2 | 7/2025 | Oberst | |
| 2013/0168979 | A1 | 7/2013 | Minemura | |
| 2014/0132012 | A1 | 5/2014 | Yoshino | |
| 2020/0031209 | A1 | 1/2020 | Fukui | |
| 2021/0340793 | A1 | 11/2021 | Oberst | |
| 2022/0186530 | A1* | 6/2022 | Wilke | E05B 85/14 |
| 2023/0417087 | A1* | 12/2023 | Oberst | E05B 81/64 |
| 2023/0420200 | A1 | 12/2023 | Oberst | |
| 2023/0420201 | A1* | 12/2023 | Oberst | H01H 21/04 |
| 2024/0110410 | A1 | 4/2024 | Yong | |

FOREIGN PATENT DOCUMENTS

| | | | |
|---|---|---|---|
| DE | 102015102839 | A1 | 10/2015 |
| DE | 102016202215 | A1 | 8/2017 |
| DE | 102016106651 | A1 | 10/2017 |
| DE | 102017104514 | A1 | 3/2018 |
| DE | 102018117226 | A1 | 1/2020 |
| DE | 102019100787 | A1 | 7/2020 |
| DE | 102019129898 | A1 | 5/2021 |
| DE | 102021105801 | B3 | 6/2022 |
| DE | 102021132330 | A1 | 6/2023 |
| DE | 102023100577 | A1 | 7/2023 |
| DE | 102022102402 | A1 | 8/2023 |
| DE | 102022104911 | A1 | 9/2023 |
| DE | 102023111403 | A1 | 11/2023 |
| DE | 102022115229 | A1 | 12/2023 |
| DE | 102022207400 | A1 | 1/2024 |
| DE | 202024100401 | U1 | 2/2024 |
| DE | 102022122345 | A1 | 3/2024 |
| DE | 202024100582 | U1 | 3/2024 |
| DE | 202024100584 | U1 | 3/2024 |
| DE | 102022126153 | A1 | 4/2024 |
| DE | 102022128434 | A1 | 5/2024 |
| DE | 102024117807 | A1 | 1/2025 |
| DE | 102023132035 | A1 | 5/2025 |
| EP | 1431994 | A2 | 6/2004 |
| EP | 1568053 | A1 | 8/2005 |
| EP | 1677324 | A2 | 7/2006 |
| EP | 2800117 | A1 | 11/2014 |
| EP | 2886760 | A1 | 6/2015 |
| EP | 3044040 | A1 | 7/2016 |
| EP | 3079211 | A1 | 10/2016 |
| EP | 3044040 | B1 | 6/2017 |
| EP | 3512727 | A1 | 7/2019 |
| FR | 2865708 | A1 | 8/2005 |
| WO | 2004042177 | A1 | 5/2004 |

OTHER PUBLICATIONS

Examination Report dated Jan. 4, 2023 in German application No. 10 2022 115 843.8, filed on Jun. 24, 2022 (7 pages).

Examination Report dated Jan. 4, 2023 in German application No. 10 2022 115 844.6, filed on Jun. 24, 2022 (6 pages).

* cited by examiner

100

100

100

200

MODULE FOR GENERATING OPENING SIGNALS

RELATED APPLICATION

The present application claims the benefit of German Patent Application No. 10 2022 115 844.6, filed Jun. 24, 2022, the contents of which are hereby incorporated by reference.

BACKGROUND

Signal generators are required to control drives, in particular electric drives, that enable the automatic opening of a vehicle door. The signal generators are configured as microswitches, for example, and are typically actuated by the user. For this purpose, the switches for signal generation can be connected to various actuating mechanisms, such as knobs or levers. To open the vehicle door, the actuating mechanism, for example a door lever, is moved to an open position by the user, thereby closing the switch and thus an electric drive circuit.

For example, the vehicle doors may consist of a sliding door or a swing door. In particular, due to the narrow interior of such vehicle doors, it is often very complex and challenging to achieve a reliable connection between the contacts of the switch and the electric drive. Also, premature wear of the switch can occur very quickly.

Based on the aforementioned problem, the object of the disclosure is to simplify the installation of signal generators or to improve the hold times.

SUMMARY

The disclosure relates to a module for generating signals, in particular signals for opening vehicle doors or flaps, substantially as illustrated by and described in connection with at least one of the figures, as set forth more completely in the claims. According to a further aspect, the disclosure relates to an actuating mechanism and a vehicle having the module according to the disclosure. The disclosure will be described in further detail below with respect to the examples shown in the figures.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
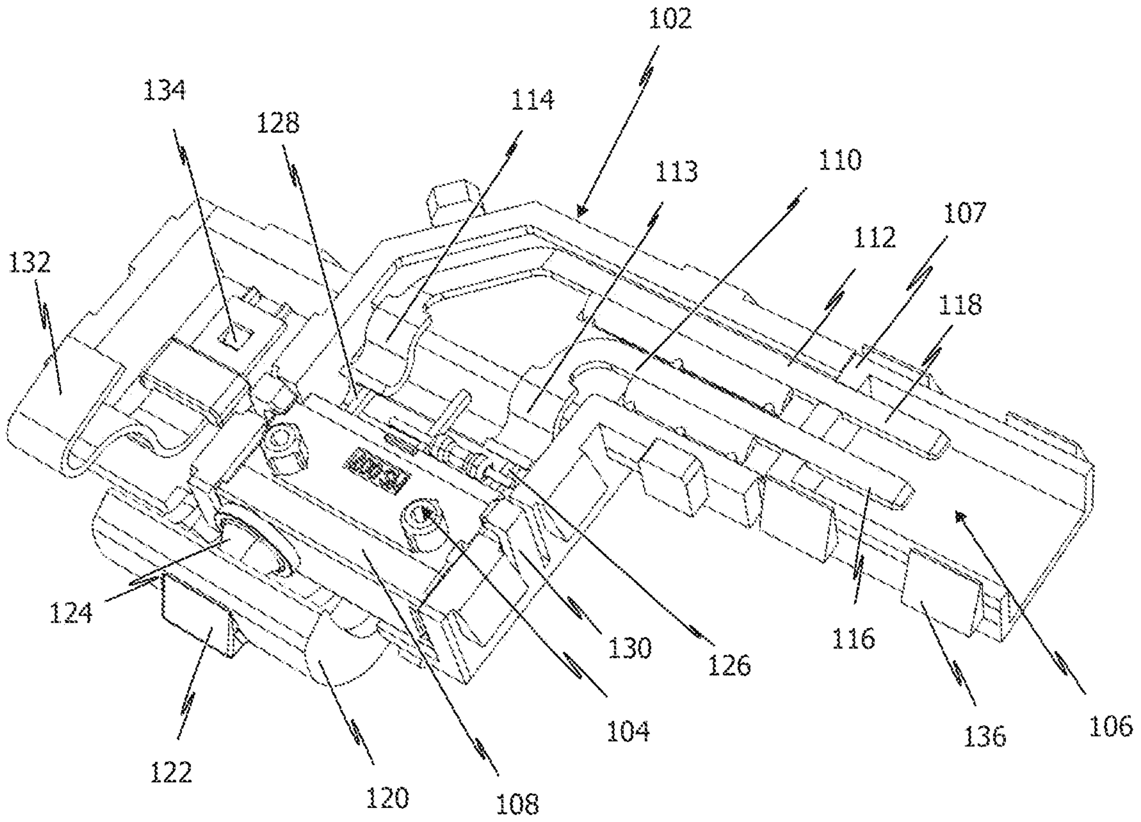
FIG. 1 is a schematic perspective view of a module according to an example of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Accordingly, the present disclosure relates to a module for generating opening signals, in particular to signals for opening vehicle doors, the module comprising: a housing having a plug-in region and a switch region; at least one switch, in particular a microswitch, which is connected, in particular releasably connected, to the switch region of the housing; electrical contacts which are releasably connectable to the at least one switch and extend from the switch region at least partially into the plug-in region, wherein the electrical contacts are designed to produce an electrical contact with an on-board plug for transmitting an electrical signal, wherein the electrical contacts each comprise a first end, which, in the installed state, is preloaded, respectively, against one of the contacts of the at least one switch.

By preloading the electrical contacts in the installed state of the module, a reliable electrical connection between the contacts of the switch and the electrical contacts of the module is ensured. Accordingly, the electrical contact is achieved directly by the installation of the module, so that the switches do not have to be individually contacted, for example wired, during manufacturing. This simplifies assembly in the interior of a vehicle door in particular.

According to another example, the first ends of the electrical contacts are elastic. Accordingly, the first ends are particularly easy to preload against the contacts of the switch. These can be elastically deformed, for example by installing the module in the interior of the vehicle door, in order to force the electrical contacts against the contacts of the switch. At the same time, by removing the module, the connection between the electrical contacts and the contacts of the switch is interrupted by the resetting force of the electrical contacts, so that the electrical contacts or the switch can simply be replaced.

According to another example, the first end of the electrical contacts is designed so as to establish a linear contact between the first end of the electrical contacts and the contacts of the at least one switch. The term "linear contact" is understood to signify that the first end of the electrical contact does not come into contact with the terminals of the switch on a flat basis and also not only in a point. Rather, the electrical contacts each have a contact edge at their first end, which is configured to be preloaded against the contacts (terminals) of the switch. By such a configuration of the electrical contacts, a tangential contact of the electrical contacts with the contacts (terminals) of the switch can be made.

According to another example, the first end of the electrical contacts comprises an arc-shaped or pointed, in particular U-shaped or V-shaped, region for contacting the contacts of the at least one switch. The arc-shaped or pointed region can in particular be directed towards the electrical contacts of the switch. Due to the U or V shape, it is simultaneously possible to establish a linear contact of the electrical contacts with the contacts of the switch, and a certain degree of elasticity can be ensured.

According to another example, the first end of the electrical contacts has a flaring. The flaring increases the contact area of the electrical contacts at the first end, so that the establishment of an electrical connection between the electrical contacts and the contacts of the switch is simplified. The flaring also allows for an increased contact surface for the electrical contacts of the switch.

According to another example, the module is preferably releasably connectable to an operating element housing, in particular a door lever housing, wherein the electrical contacts are arranged in the module such that at least the first ends of the electrical contacts are preloaded by the operating element housing against the contacts of the at least one switch when the module is connected to the operating element housing. For example, the operating element housing can be a housing for an inner door handle. For example, the housing of the module can be releasably clipped onto the operating element housing, automatically pushing the operating element housing against the electrical contacts and preloading it toward the contacts of the micro-switch. Thus, by attaching the module to the operating element housing, contact can be automatically made between the electrical contacts and the switch. Other releasable connections between the operating element housing and the module can be achieved by screws or plug-in connections. In other examples, the module may be permanently connected to the operating element housing. For example, such a permanent connection can be achieved by welding, gluing, riveting, or pressing.

According to another example, the housing comprises snap connectors, in particular protrusions for snap hooks, for releasably connecting to the operating element housing. The snap connectors provide a particularly simple and fast way to connect the module to the operating element housing. The snap connectors can also ensure precise positioning of the module with respect to the operating element housing. This is particularly advantageous for vehicle doors in which the installation space is difficult to see.

According to another example, the electrical contacts extend substantially at a 90° angle between the switch region and the plug-in region. Such an arrangement of the electrical contacts achieves a particularly low design height, which is particularly advantageous with regard to the very limited design space of vehicle doors.

According to another example, the electrical contacts comprise anchoring elements which can be releasably inserted into corresponding openings, in particular elongated holes, of the housing. The electrical contacts may be quickly and easily attached to the housing by the anchoring elements. This is particularly advantageous when manufacturing the module or replacing the electrical contacts or the switch.

According to a further aspect, the present disclosure relates to an actuating mechanism for opening vehicle doors, wherein the actuating mechanism comprises an operating element housing having an operating element which is movable therein, in particular a pivotable, mounted operating element and a module described above. The module is preferably releasably connected to the operating element housing.

In a further aspect, the present disclosure relates to a vehicle having an actuating mechanism as described above.

FIG. 1 shows a first example of a module for generating opening signals in accordance with the present disclosure. The module 100 comprises a housing 102 having a switch region 104 and a plug-in region 106. The housing 102 shown herein is formed in one piece. This can be configured as a plastic body manufactured in an injection molding process, for example.

The housing 102 is configured as an upwardly open half-shell. The half-shell can be releasably connected to an operating element housing in particular, for example a door lever housing (not shown). For this purpose, the housing 102 can comprise a plurality of ramp-like projections 136, which serve to releasably connect the module 100 to the operating element housing, in particular to clip it to said housing. It should be noted that the housing 102 of the module alternatively also connects to many other movable vehicle components, such as glove compartments, rear flaps, center arm rests, etc., to generate an electrical signal upon actuation of the vehicle components.

A switch, in particular a microswitch 108, is releasably connected to the switch region 104 of the housing 102. For this purpose, the housing 102 may comprise one or more receiving openings, which serve to align the switch with respect to the housing 102. FIG. 1 further includes snap-fit connectors 130 configured as snap hooks that releasably connect the switch 108 to the housing. As will be described in more detail below, the switch 108 is in particular configured as a button; however, any further mechanical or electrical switch variant is also conceivable.

The module 100 has first and second electrical contacts 110, 112. The electrical contacts 110, 112 each have a first end 113, 114 and an opposing second end 116, 118. At the first ends 113, 114, the electrical contacts are connected to corresponding contacts of the switch 104. More particularly, the first electrical contact 110 is connected at its first end 113 to a first contact 126 of the switch 108. The second electrical contact 112 is connected to a second electrical contact 128 of the switch 108 via its first end 114.

The second ends 116, 118 of the electrical contacts 110, 112 extend into a plug-in region 106 of the housing 102. The plug-in region 106 serves in particular to receive a corresponding plug for supplying voltage to an electric drive, or to supply each other consumer. For example, such a plug may be inserted into the plug-in region 106 and pushed onto the second ends 116, 118 of the electrical contacts 110, 112. For this purpose, the shape of the second ends 116, 118 is adapted to the respective plugs. In other words, the electrical contacts 110, 112 serve as adapters between the terminals of the switch 108 and the plug. The module can thus be easily adapted to different plugs, for example by attaching electrical contacts 110, 112 with alternatively shaped, second ends (not shown). Thus, replacing the switch 108 is not necessary.

For example, the second ends 116, 118 of the electrical contacts 110, 112 may be received in a rear wall 107 of the plug-in region 106. In the illustrated example, the rear wall 107 is in particular configured with two recesses, wherein each of the recesses serves as a guide for one of the two electrical contacts 110, 112.

The electrical contacts 110, 112 extend substantially perpendicularly, that is, at an angle of about 90°, between the first and second ends 113, 114, 116, 118.

In the example according to FIG. 1, the plug-in region 106 is formed as a half-shell. The first (e.g., "lower") half-shell shown here may be completed by a corresponding second (e.g., "upper") half-shell that is part of the operating element housing. The two half shells form a complete socket for receiving a corresponding plug of the electric drive. Accordingly, once the second half-shell of the operating element housing is connected to the first half-shell, the electrical contacts are fixedly connected to the rear wall 107 of the plug-in region 106.

Figure 2:
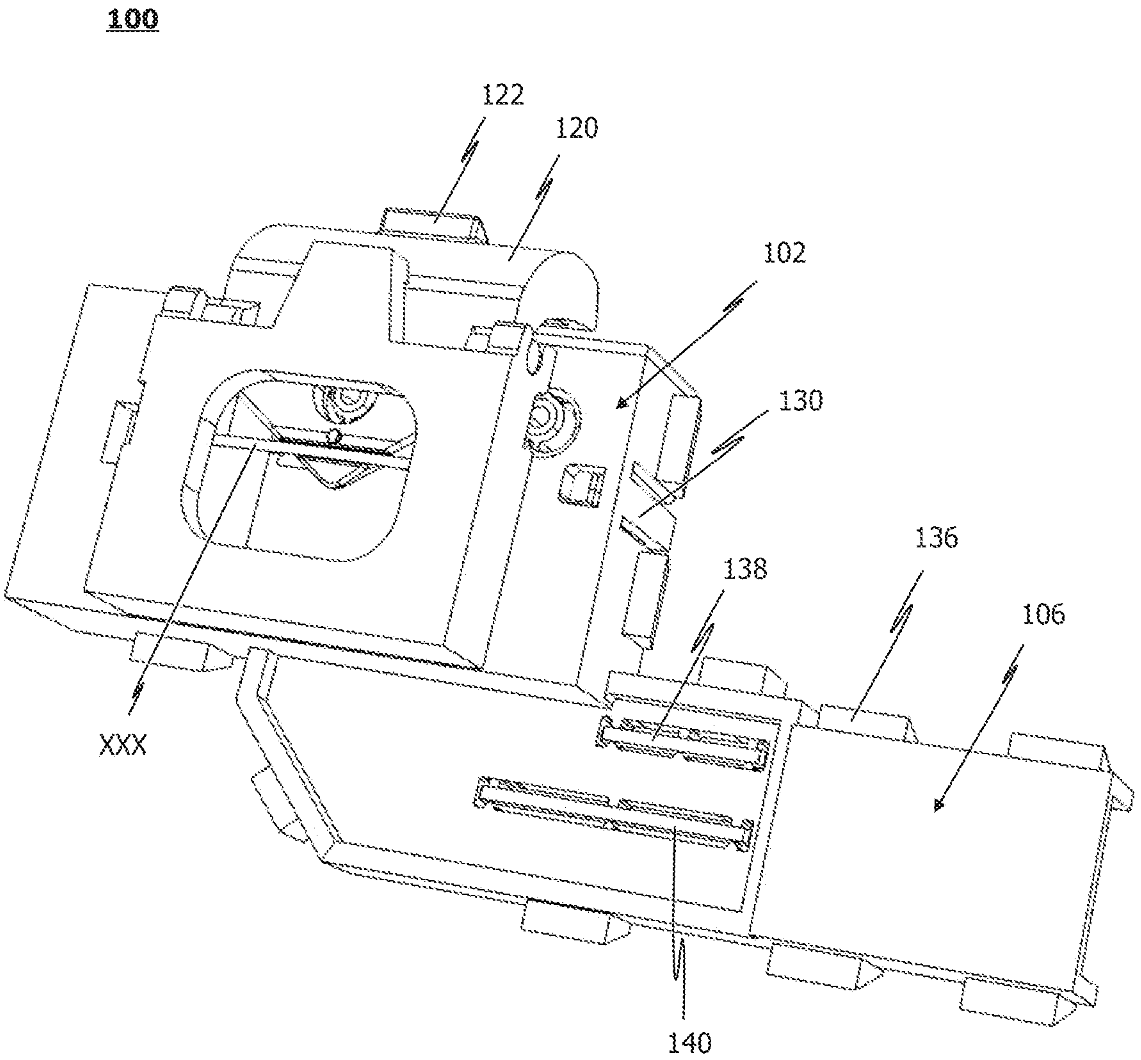
FIG. 2 is a schematic bottom perspective view of the module shown in FIG. 1.
Figure 6:
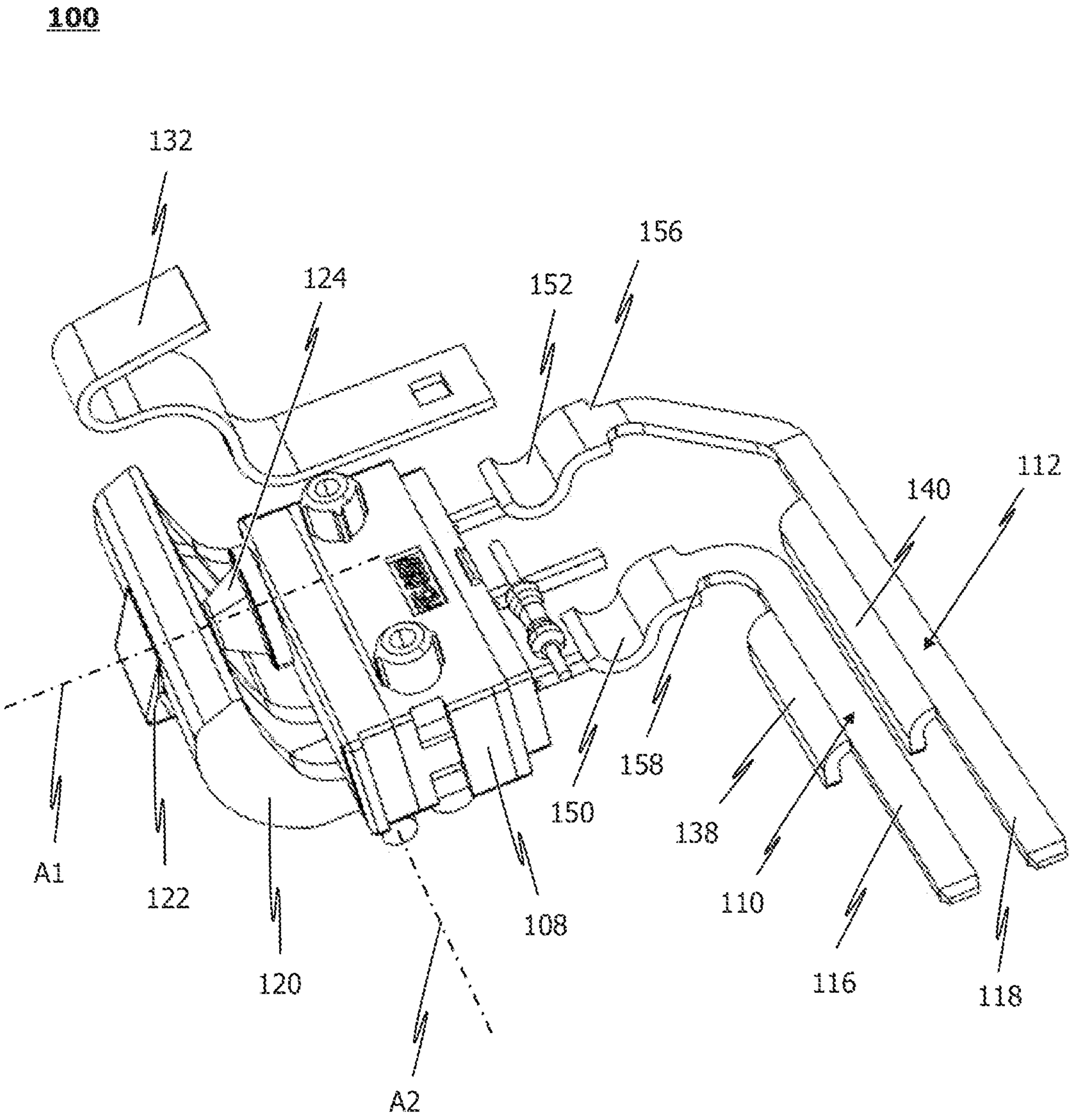
FIG. 6 is an exploded view of the components received in the housing.

It can further be seen from FIGS. 2 and 6 that the two electrical contacts 110, 112 are each equipped with anchoring elements 138, 140. The anchoring elements 138, 140 serve to releasably connect the electrical contacts to the housing 102. To this end, the anchoring members 138, 140 are inserted into corresponding openings of the housing 102.

The first ends 113, 114 of the electrical contacts 110, 112 are designed elastically. The first ends may in particular also be designed to be preloaded against the first and second contacts 126, 128 of the switch 108 upon insertion of the anchoring elements 138, 140 into the housing 112. In other words, elastic deformation of the first ends 113, 114 preferably occurs once the anchoring elements are inserted into the housing 102. This is the case because the first ends 113, 114 and the contacts 126, 128 of the switch are arranged to overlap each other when the electrical contacts are inserted into the housing.

Figure 3:
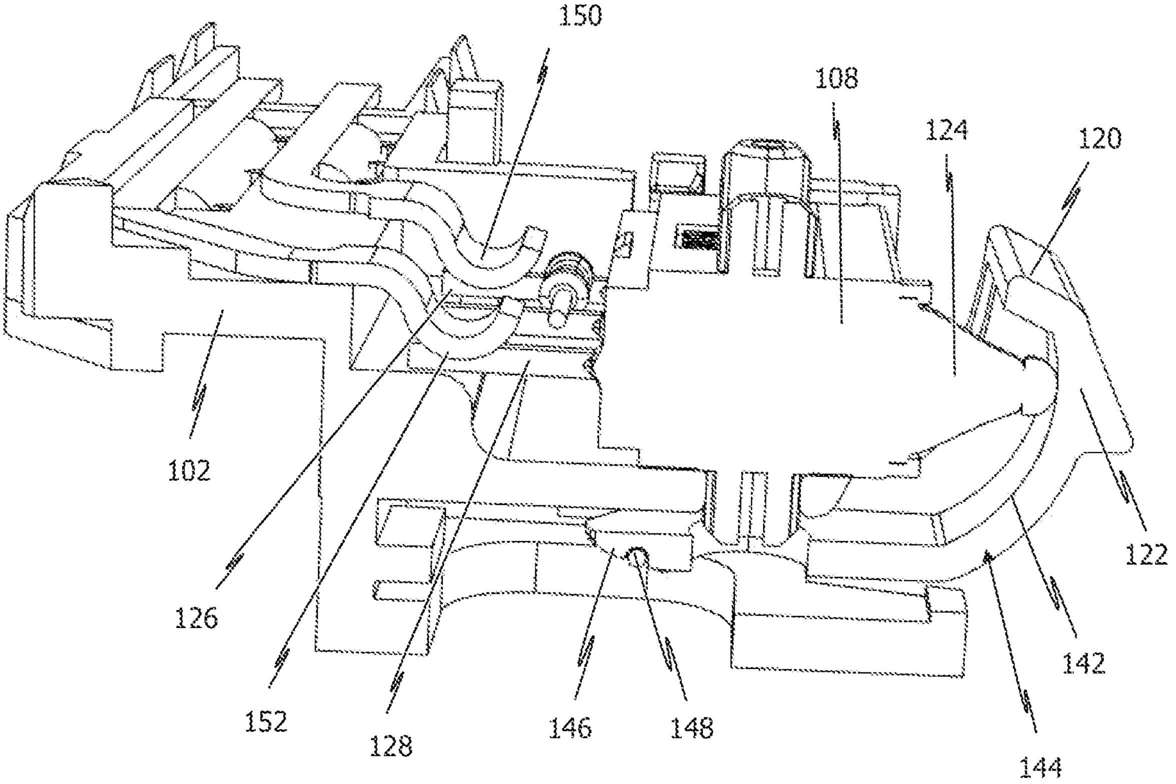
FIG. 3 is a schematic cross-section through the example of the module shown in FIG. 1.

The first ends 113, 114 of the electrical contacts 110, 112 have white arc-shaped, in particular U-shaped, regions 150, 152, as can be seen for example in FIG. 3. The arc-shaped regions 150, 152 of the electrical contacts 110, 112 are configured to protrude when installed relative to the remaining portions of the contacts. In other words, the arc-shaped regions 150, 152 are arranged outside the plane of the remaining regions of electrical contacts. Accordingly, it can be ensured that only the bent regions 150, 152 are pressed and deformed against the electrical contacts 128, 126 of the switch 108 when the electrical contacts are inserted into the housing 102. The electrical contacts 110, 112 can also be additionally pressed onto the electrical contacts 126, 128 of the switch 108 by the operating element housing when connected to the housing 102.

The arc-shaped regions 150, 152 are designed to establish a linear contact between the electrical contacts 110, 112 and the terminals (contacts) of the switch 108. In the cross-sectional view shown in FIG. 3, the contact is made between the lower end of the U-shaped regions 150, 152 and an upper surface of the contacts 126, 128. The linear contact therefore extends into the drawing plane of FIG. 3. Instead of the arc-shaped regions 150, 152, other shapes that allow for linear contact with the terminals/contacts 126, 128 of the switch 108 can also be chosen. For example, the first ends could also be provided with a V-shaped region.

As shown in FIG. 6, the first ends of the electrical contacts 110, 112 have a flaring 156, 158. The flarings 156, 158, in particular, serve to provide a larger abutment surface area of the first end opposite the contacts 126, 128 of the switch 108.

The switch 108 is a button configured as a micro-switch, which comprises a push button 124 for activating the switch. For example, the push button 124 may be preloaded into the position shown in FIG. 1. To this end, a reset element (not shown), for example a flat spring, is provided within the microswitch 108. In conventional signal generators for opening signals of electrical door drives, corresponding buttons are controlled directly via an actuating mechanism. The actuating mechanism may be, for example, a door lever or a door knob. In contrast, the module 100 according to the present disclosure comprises an actuating flap 120. In the installed state of the module 100, this is arranged between the actuating mechanism and the push button 124 of the microswitch 108. The actuating flap serves to protect the push button 124 from wear and tear. In particular, the actuating flap 120 reduces a shear movement relative to the push button 124 to a minimum.

The actuating flap 120 is hinged to the module housing 102 in a manner enabling it to pivot. For this purpose, the actuating flap 120 comprises one or more pivot pins (154, FIG. 4), which are anchored in corresponding pivot sockets of the housing 102. The actuating flap 120 is pivotable relative to the pivot axis A2 shown in FIG. 6. The pivot axis A2 is oriented substantially perpendicularly to a longitudinal axis A1 of the push-button 124.

As can be seen in particular in FIG. 3, the actuating flap 120 comprises a curved inner surface 124, which is preferably in contact with the push button 124. Thus, when the actuating flap 120 is pivoted, the push button 124 may be actuated.

To pivot the actuating flap 120, it has a protrusion 122. For example, from FIG. 3, it can be seen that this protrusion 122 has a ramp-shaped region and a shoulder region. The protrusion 122 serves to translate a substantial movement of the actuating mechanism (e.g., door lever) into a pivoting movement of the actuating flap 120 opposite the micro-switch 108.

A first reset element shown as a wire spring 148 is further discernible in FIG. 3. The wire spring 148 is connected to the housing 102 on the one hand and to a lever area 146 of the actuating flap 120 on the other hand. The first reset element which is configured as the wire spring 148 serves to preload the actuating flap 120 to the first position shown in FIG. 3. In the first position shown in FIG. 3, the actuating flap 120 is in particular arranged such that the push button

124 abuts the curved inner surface 142. A pivoting of the actuating flap 120 towards the push button 124 is accomplished against the return force of the wire spring 148.

Figure 4:
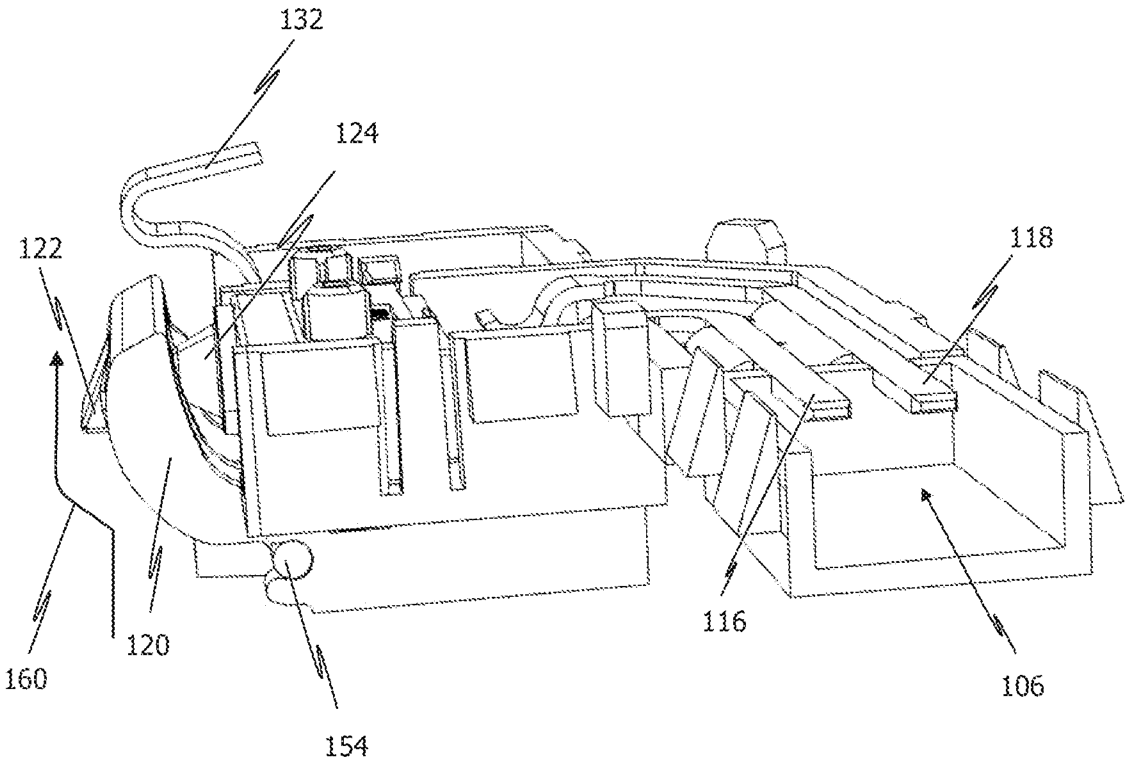
FIG. 4 is a schematic side perspective view of the module according to FIG. 1 in a first position of the actuating flap.
Figure 5:
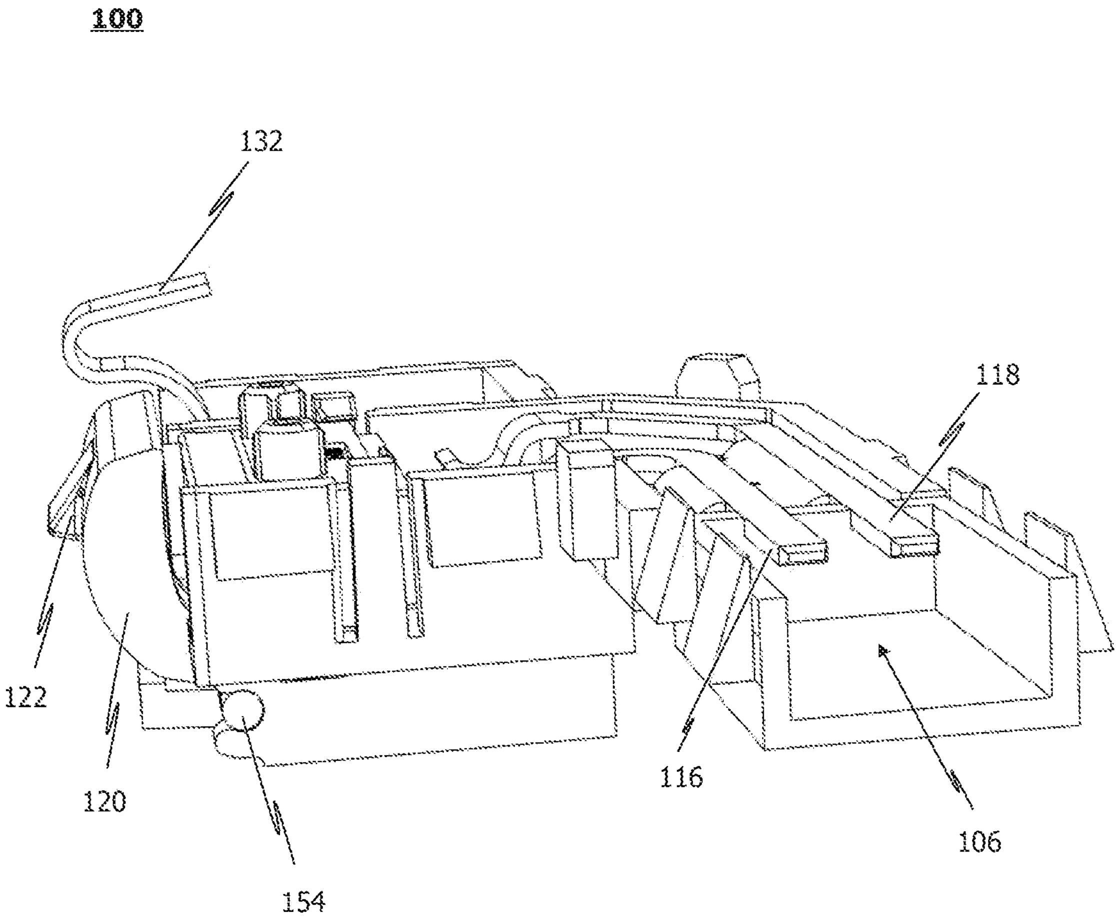
FIG. 5 is a schematic side perspective view according to FIG. 4 in a second position of the actuating flap.

FIGS. 4 and 5 show a comparison of the module in a first and a second position of the actuating flap 120. In the normal state, that is, when the switch 108 is not to be actuated, the actuating flap 120 is in the first position shown in FIG. 4. In this first position, for example, the actuating flap abuts the tip of the push button 124. However, in this position, activation of the switch 108 by the push button 124 does not yet occur.

A surface 160 of an actuating mechanism is schematically shown in FIG. 4. The ramp-like surface 160 is herein oriented opposite the module and therefore opposite the actuating flap 120, such that when the actuating mechanism (for example, pivoting the door lever) moves over the protrusion 122, it thus pivots the actuating flap 120 towards the push button 124.

A second position of the actuating flap 120 is shown in FIG. 5. In FIG. 5, the actuating flap 120 was pivoted clockwise by contacting the ramp-like surface 160 with the protrusion 120, that is, towards the push button 124. This activates the microswitch 108 without imparting significant longitudinal forces on the push button 124. Rather, the interaction of the ramp-shaped surface 160 with the protrusion 122 translates the substantially translational movement of the actuating mechanism into a pivoting movement of the actuating flap 120, which then acts on the switch in the longitudinal direction of the push button 124. Thus, wear of the push button 124 is significantly reduced.

The module 100 further includes a second reset element 132, shown herein as a return spring. The second reset element 132 is arranged adjacently to the actuating flap 120, as shown in FIGS. 4 and 5. The second reset element 132 is arranged such that the ramp-shaped surface 160 first contacts the protrusion 122 and transitions the actuating flap 122 to its second position before the actuating mechanism (e.g., the door lever) contacts the second reset element 132. By contacting the actuating mechanism with the second reset element 132, there is further haptic feedback for the user. In particular, the second reset element 132 acts as a movable stop. This means that, upon contact of the actuating mechanism with the second reset element 132, the user initially experiences a resistance that acts against further movement of the actuating mechanism and feels like a limit stop during normal actuation. However, the second reset element 132 may still be moved against its resetting force, especially when the actuating mechanism is continued with higher force. This may be used, for example, to further move the actuating mechanism for a mechanical emergency release (e.g., via a Bowden cable) than is the case due to the perceived end stop. Of course, this is only necessary in exceptional cases, so that the resetting force of the second reset element 132 can be set relatively high.

Figure 7:
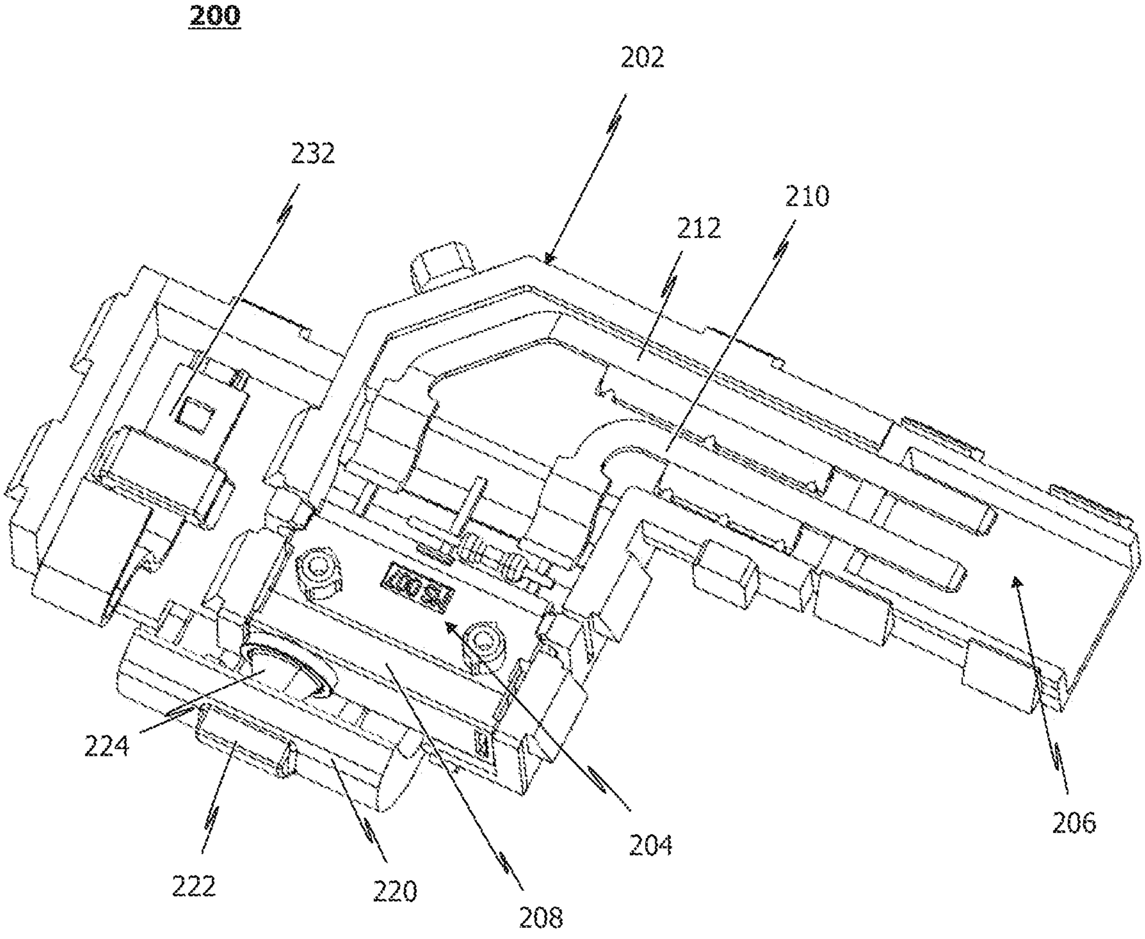
FIG. 7 is a schematic top perspective view of an example of the module according to the present disclosure.
Figure 8:
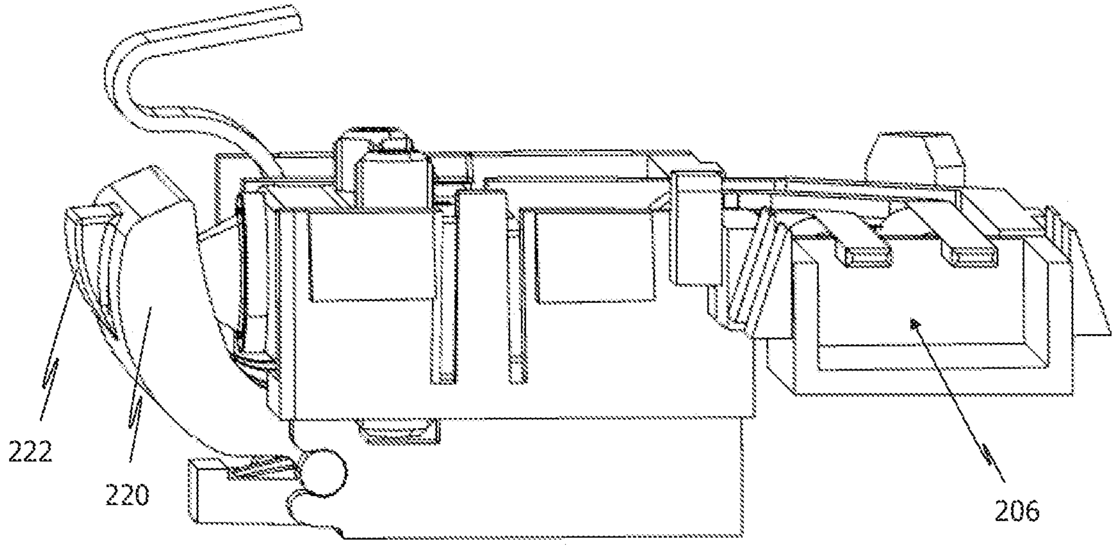
FIG. 8 is a schematic side perspective view of the module according to FIG. 7 in a first position of the actuating flap.

A second example of a module 200 according to the present disclosure can be seen in FIGS. 7-10. Herein FIG. 7 shows a schematic top perspective view of the module 200 according to the second example. The module 200 according to the second example also comprises a preferably one-piece housing 202. The housing 202 has a switch region 204 that is connected to a plug-in region 206. A switch, in particular a microswitch 208, is releasably connected to the switch region 204 of the housing 202. First and second electrical contacts 210, 212 are connected to the contacts of the switch 208 and at least partially extend into the plug-in region 206 of the housing 202. An actuating flap 220 is pivotally arranged on the housing 202. The actuating flap 220 serves to actuate a push button 224 of the switch 208. A second reset element 232 is arranged adjacently to the actuating flap 220 and acts as a stop for the actuating mechanism in its open position.

The switch 208, electrical contacts 210, 212, and second reset element 232 are substantially identical to the corresponding elements of the first module 100. The module 200 differs from the module 100 in particular by the configuration of the actuating flap 220 and the first reset element 248 shown in FIG. 9.

Compared to the actuating flap 120 of the module 100, the actuating flap 220 of the module 200 has a protrusion 222 which is arranged inversely. In other words, the protrusion 222 has a protrusion with a shoulder region that is oriented upward. In contrast, the ramp area is oriented downward.

Figure 9:
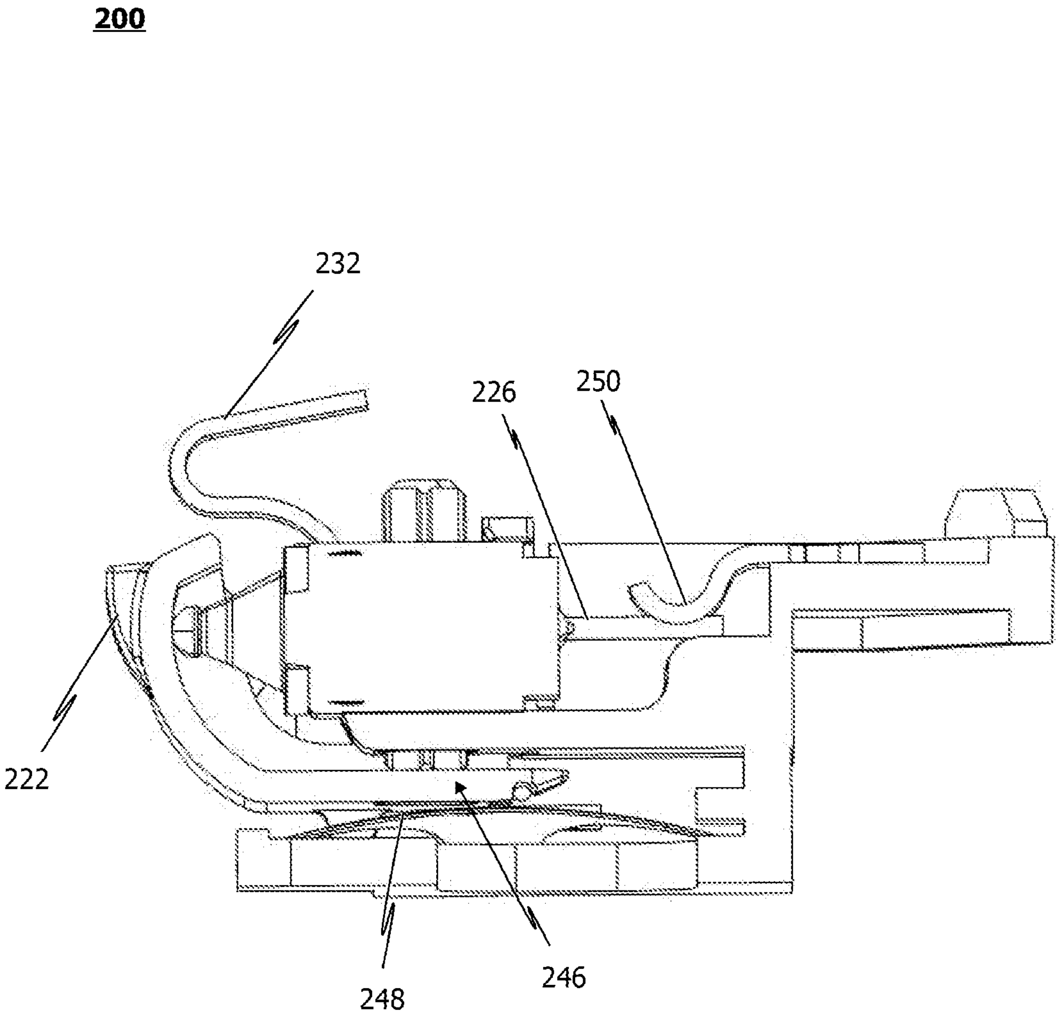
FIG. 9 is a schematic cross-section through the module shown in FIG. 8.

It can be seen from FIG. 9 that the actuating flap 220 is preloaded to the first position. In particular, it is preloaded to the first position by a first reset element. The first reset element 248 is configured as a flat spring connected to the housing 202 of the module 200. The flat spring is arranged at the bottom, i.e., a lever portion 246 of the actuating flap 220, in the illustration according to FIG. 9. The flat spring 248 pushes the actuating flap 220 counterclockwise in FIG. 9 and thereby preloads it to the first position. As long as the actuating mechanism is not activated, the actuating flap 220 is preloaded to the first position shown in FIG. 9.

Figure 10:
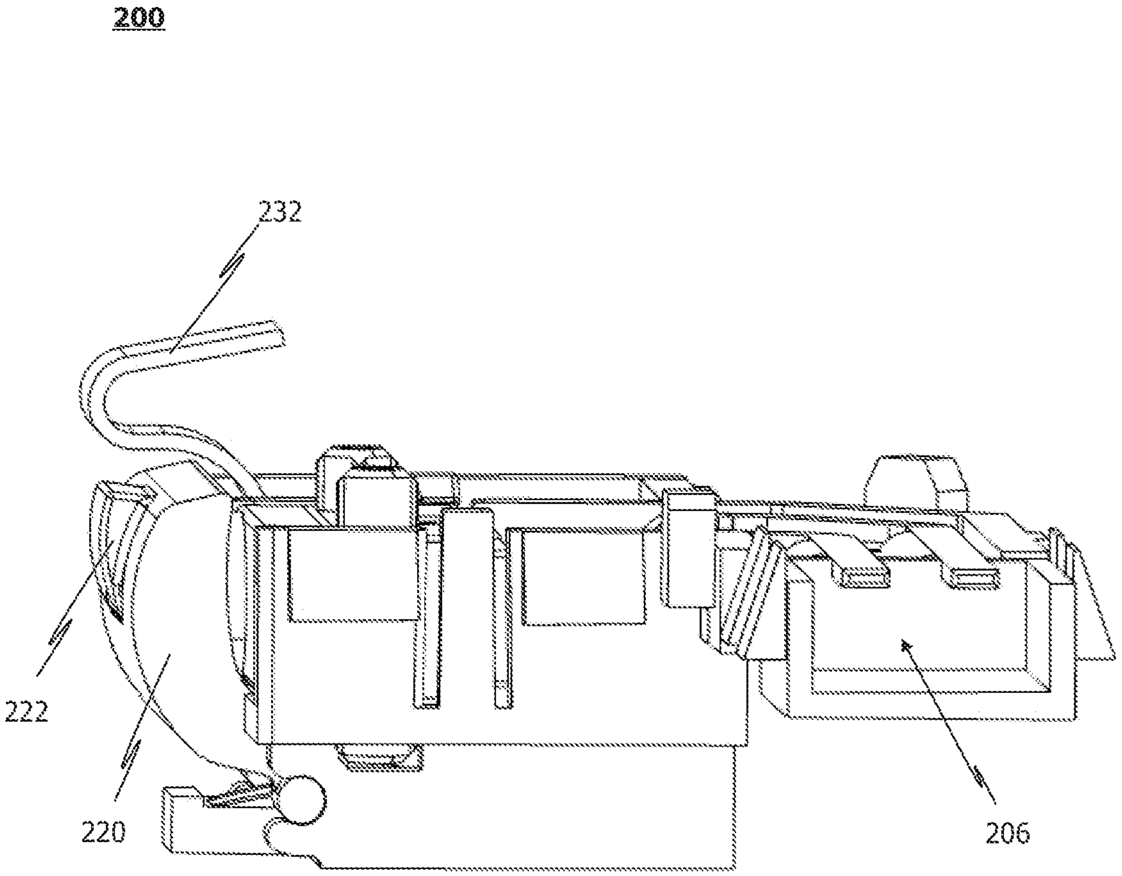
FIG. 10 is a schematic side perspective view of the module according to FIG. 7 in a second position of the actuating flap.

FIG. 10 shows module 200 in the second position. The flat spring 248 is deformed in the second position (not shown). When the actuating flap 220 is transferred to the second position, the flat spring, which is in particular configured as a snap frog, is snapped over. This generates an acoustic signal/feedback signaling to the user that actuation of the actuating flap and thus the switch 208 has occurred.

For example, when the switch 208 is actuated, a circuit may be closed to provide a power supply to a consumer, for example an electric drive for opening/unlocking doors. In other examples, the circuit may be closed in the idle state of the switch, thereby interrupting the circuit upon actuation of the switch by the operating element and the actuating flap 220. The disclosure is thus not limited to the function of the switch shown herein, but essentially relates to actuation of the switch by the actuating flap 220, which is arranged between the operating element (e.g., door lever) and the switch 108.

Another aspect lies in the connection of the terminals of the switch 108 to the plug-in region 106 by the electrical contacts 110, 112.

Once the user releases the actuating mechanism, the actuating flap 220 is transitioned to the first position by the flat spring 248. The flat spring 248 shown in FIG. 9 not only serves to preload the actuating flap 220 to its first position, but also allows for further acoustic and/or haptic feedback upon activation of the switch 208.

Alternatively, the actuating flap 220 may also be preloaded against the switch in its rest position, i.e., the actuating flap 220 may hold the switch pressed in its rest position. Accordingly, moving the actuating flap, in particular by pivoting, through the operating element (e.g., door lever), would lead to the release or opening of the switch.

The present disclosure is not limited to the examples shown in the figures, but rather, results when all of the features disclosed herein are considered together. In particular, it is conceivable, for example, to apply the wire spring of the first example in the second example. The same applies to the flat spring according to the second example, which can also be applied to the first example. The orientation of the protrusion of the actuating flap is also freely selectable.

Also, only one switch is shown in each of the figures. However, it is conceivable that two or more switches are accommodated in the housing, and the electrical contacts are in communication with all the switches simultaneously.

What is claimed is:

1. A module for generating signals, in particular signals for opening vehicle doors or flaps, wherein the module comprises:

a housing having a plug-in region and a switch region;

at least one switch, in particular a microswitch, which is connected, in particular releasably connected to the switch region of the housing, wherein the at least one switch includes switch electrical contacts;

electrical contacts, which are releasably connectable to the at least one switch and extend from the switch region at least partially into the plug-in region, wherein the electrical contacts are configured so as to make electrical contact with an on-board plug for transmitting an electrical signal, wherein the electrical contacts each comprise a first end which, in an installed state, is biased against one of the switch electrical contacts of the at least one switch, wherein the module is releasably connectable to a door lever housing, and wherein the electrical contacts are arranged in the module such that at least the first ends of the electrical contacts are preloaded by the door lever housing against the switch electrical contacts of the at least one switch when the module is connected to the door lever housing.

2. The module according to claim 1, wherein the first ends of the electrical contacts are configured elastically.

3. The module according to claim 1, wherein the first ends of the electrical contacts are configured so as to establish a linear contact between the first ends of the electrical contacts and the switch electrical contacts of the at least one switch.

4. The module according to claim 3, wherein at least one of the first ends of the electrical contacts comprises an arc-shaped or pointed, in particular U-shaped or V-shaped, region, for contacting the contacts of the at least one switch.

5. The module according to claim 1, wherein at least one of the first ends of the electrical contacts comprises a flaring.

6. The module according to claim 1, wherein the housing comprises snap connectors, in particular wherein the snap connectors comprise protrusions for snap hooks, for releasably connecting to the door lever housing.

7. The module according to claim 1, wherein the electrical contacts extend substantially at a 90° angle between the switch region and the plug-in region.

8. The module according to claim 1, wherein the electrical contacts comprise anchoring elements, which can be releasably inserted into corresponding openings, in particular wherein the corresponding openings comprise elongated holes, of the housing.

9. An actuating mechanism for opening vehicle doors, wherein the actuating mechanism comprises:

a door lever housing having an operating element, in particular housing a door lever, stored therein in a movable and pivotable, manner; and a module according to claim 1, wherein the module is releasably connected to the door lever housing.

10. A vehicle having the actuating mechanism according to claim 9.

* * * * *